United States Patent Office 3,556,901
Patented Jan. 19, 1971

3,556,901
APPARATUS FOR SUPPLYING FLEXIBLE SHEET MATERIAL
William Tearne, Birmingham, England, assignor to The Dunlop Company Limited, London, England, a British company
Filed Mar. 8, 1968, Ser. No. 711,724
Claims priority, application Great Britain, Mar. 17, 1967, 12,611/67
Int. Cl. B29h 17/18, 17/20
U.S. Cl. 156—406
11 Claims

ABSTRACT OF THE DISCLOSURE

Application for supplying reinforced sheet material to a tire building drum comprising four arms, pivotally mounted on a turntable and extendable radially outwardly of the turntable, for holding the material, material storage units, one for each arm, a conveyor for feeding the material from the storage unit on a conveying surface, and a material aligning means located at the end of each arm comprising an air cushion device, a pair of guide members and a roller.

---

This invention relates to apparatus for supplying rubberised flexible strip material for example breaker strip material for pneumatic tires.

In the manufacture of pneumatic tires having a radial cord carcass it is essential to have the breaker layers disposed accurately and symmetrically upon the carcass and it is now proposed to provide improved apparatus for feeding supplies of flexible strip material, for example breaker strips, one-at-a-time, to a carcass carried on a tire building drum which enables a more accurate, symmetrical disposition of the strips on a carcass.

According to the present invention there is provided apparatus for supplying flexible sheet material comprising a storage unit for said material, releasable material holding means for holding an end of a length of said material extending from the storage unit, the material holding means being operable to release said length of material to permit a supply of material to be made from the storage unit and being operable to hold an end of a length of material to permit a supply of material to be made from the storage unit after said supply has been made, and material aligning means comprising guiding members on the material holding means, an air cushion device on the conveyor to enable more efficient lateral alignment by the guide members and a roller on the material holding means to roll down the said material to maintain the alignment.

One aspect of the invention comprises apparatus for the supply of tire building material in the form of lengths of rubberised cord fabric of different descriptions, e.g., different widths and/or different cord bias angles.

Preferably the material holding means comprises an arm provided with a plurality of spaced-apart rollers for supporting the flexible strip material.

In one construction the storage unit comprises a rotatable turret for storing a plurality of lengths of flexible sheet material in material carrying positions spaced around the axis of rotation of the turret. A plurality of arms are provided, one for each material carrying position, for supporting an end of a length of flexible sheet material located in its material carrying position. The turret is intermittently rotatable to move said arms in succession into a material removal station of the turret and each arm when located in the material removal station of the turret is movable between a retracted position and an extended position.

A conveyor is provided leading to the supply position presented by one or other of the arms for feeding material to the said supply position. The linear speed of movement of the conveyor is preferably the same as the linear speed of take up of the material, for example by a tire building drum.

Preferably the guide members comprise a pair of spaced-apart guides adjacent to the free end of each arm and located one on each side of each arm, each guide having an inclined leading portion so that together the guides present a gradually narrowing entry for the material.

Preferably also, the conveyor is provided with an air cushioning device comprising a porous plastic surface to assist in the accurate and symmetrical location of the material by the guide members. The porous plastic surface is located adjacent to the material guides and the application of air pressure to the porous plastic surface forms an air cushion between the strip and the porous plastic surface to allow the flexible strip material to ride freely between the guides and align itself accurately with them.

Preferably, one roller is located adjacent to the end of each arm to pass over the flexible strip material after it has been accurately aligned and so prevent lateral displacement of the strip from its aligned position.

One embodiment of the invention will now be described by way of example with reference to the accompanying drawings wherein.

Figure 1:
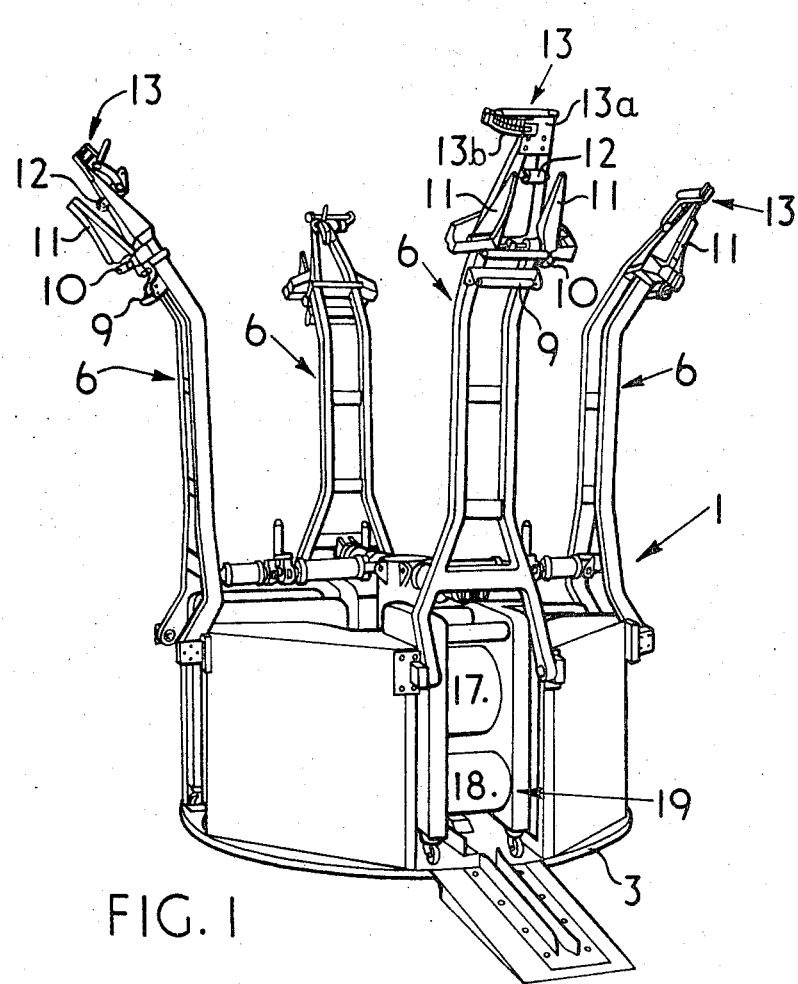
FIG. 1 is a perspective view of the apparatus for supplying flexible sheet material.

The apparatus comprises a four-arm dispenser 1 for supplying lengths of rubberised cord fabric 2 of various widths and cord bias angles, one-at-a-time, to a tire building drum 15, the apparatus being mounted on a turntable 3 rotatable step-by-step by means of an electric driving motor mechanism (not shown). Each of the four arms 6 are presented, one-at-a-time, to a supply position adjacent to the periphery of a tire building drum 15 and to a conveyor 7 comprising an endless moving belt 5 located in the supply position.

Each of the arms 6 is pivotable from an upwardly directed position (see FIG. 1) in which they are disposed at all times when it is clear of the supply position to a radially outwardly directed position, with respect to the turntable 3, in which attitude they are disposed when one arm is in the supply position.

Associated with each arm there is provided on the turntable a reception station 19 for accommodating a pair of spools 17 and 18, one for breaker building material in the form of parallel steel cord material covered with unvulcanised rubber, and the other for the takeup of interleaving material normally used for separating the length of breaker material to prevent mutual adhesion, the spool arrangement being in the form of a unit as described in the specification of our U.K. Pat. No. 882,503.

Each of the arms is provided with a series of spaced-apart supporting rollers 4, 8, 9 and 10 (shown in FIG. 2) which serve to carry a length of breaker material unwound from its spool and extending along the arm when the arm is in the upwardly directed position shown in FIG. 1, the rollers engaging with the underside of the breaker. Each of the arms is provided, adjacent to its free end, with a clamping device 13 provided with a surface 13a for engagement with the end of breaker strip. The said clamping means comprises a fluid pressure operated jaw 13b for clamping the said end of the breaker between the jaw 13b and said surface 13a. When the breaker arm is disposed adjacent to the conveyor 7, movement of the arm 6 towards the conveyor so as to transfer the breaker strip to the conveyor causes the rollers to move between members on the conveyor. The clamping device 13 releases the end of the breaker strip whereby the strip is relieved from the support of the rollers 4 and 8 and clamping means and transferred to the conveyor for movement thereby.

Each arm 6 is provided, adjacent to its free end, with a roller 12 for applying a breaker strip to the surface of a shaped carcass carried on the building drum 15.

Figure 3:
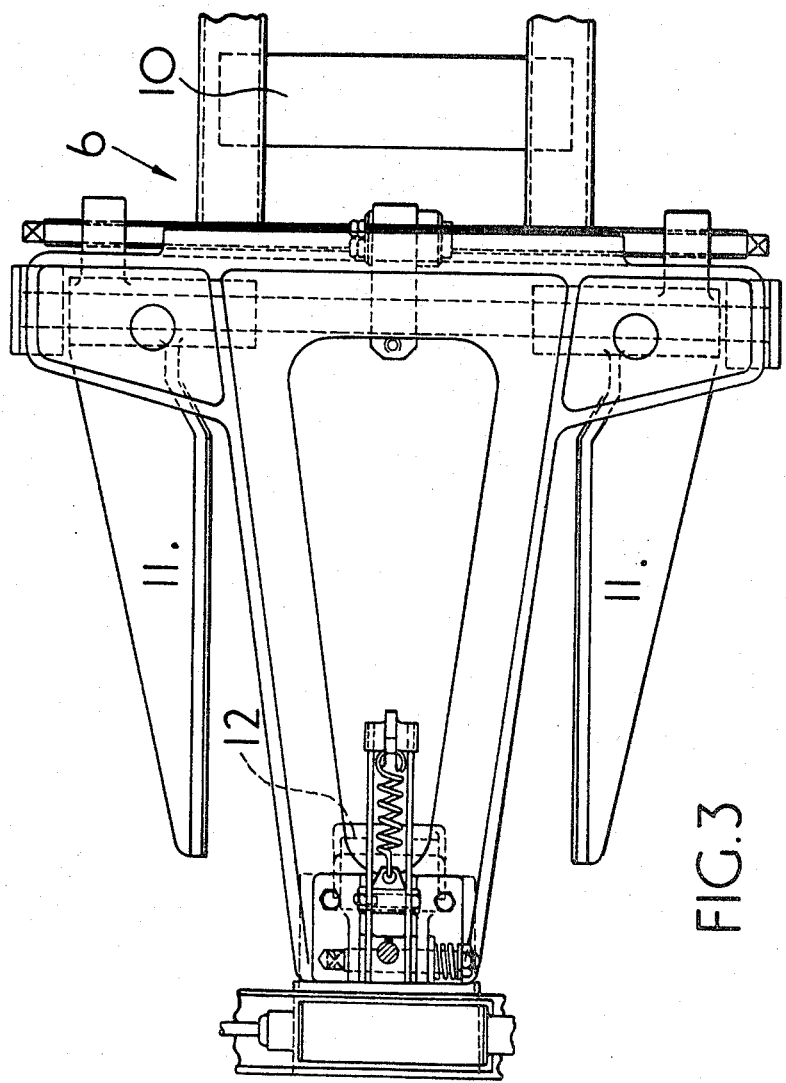
FIG. 3 is a plan view of the material guiding means.
Figure 4:
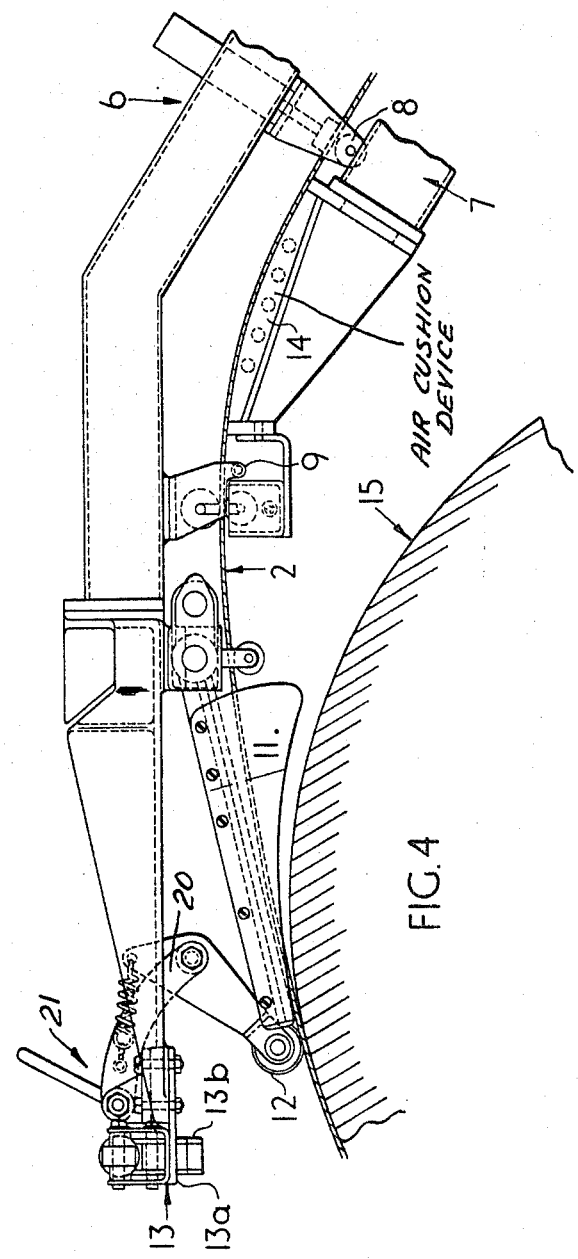
FIG. 4 is a side view of the end of the arm, showing the clamping device, and the roller in its operable position.

The roller 12 is retractable by an arm 20 pivotally mounted for movement by the handle arrangement shown generally at 21 in FIG. 4 of the drawings, so that after a breaker strip has been rolled down onto the surface of a shaped tire carcass or onto another breaker strip previously applied the roller is withdrawn radially outwardly of the tire building drum to a position remote from the breaker strip. After the roller has been withdrawn, the breaker strip is severed, and the free end remaining suspended from the arm is placed in the clamp 13 located at the tip of the arm, this step being assisted by the withdrawal of the roller. A pair of spaced-apart guides 11 is also provided, one on each side of each arm 6, each guide having an inclined leading portion so that together the guides present a gradually narrowing entry for the breaker material as shown in FIG. 3. This assists in the accurate and symmetrical location of a breaker upon a built-up carcass. Further, to assist in the accurate and symmetrical location of the breaker, the conveyor 7 is provided with a member 14 having a porous plastic surface so that, when an arm is located so as to transfer the breaker strip to the conveyor 7, the porous plastic surface is located adjacent to the breaker guides and the application of air pressure to the porous plastic surface forms an air cushion to allow the breaker strip freely to ride between the guides and align itself accurately with them.

The conveyor has attached thereto a pair of tilting breaker rollers (not shown) constructed and arranged as described in our copending U.S. patent application No. 711,725, filed Mar. 8, 1968, the rollers serving progressively to roll down, over the crown profile of the carcass, a breaker strip applied by the apparatus forming the subject of the present invention.

The operation of the apparatus will now be briefly outlined.

The turntable 3 is loaded so that each reception station 19 is filled with twin spools 17 and 18 carrying breaker fabric and a length of the breaker fabric is led from each spool along an associated arm to be carried by the supporting rollers attached thereto. The turntable 3 is indexed so that the first breaker layer is located adjacent to the supply position and the arm is actuated to lower it so that the length of the breaker strip carried by the arm is placed on the surface of the endless belt 5 of the conveyor 7, the endless belt 5 supporting the strip clear of the rollers 4 and 8 as shown in FIG. 2.

The extreme end of the breaker material is pressed by means of the roller 12 onto the tacky surface of a shaped tire carcass mounted on the adjacent tire building drum 15, and the breaker, aligned by passage between the spaced-apart guiding members 11, is drawn from its spool along the arm and wrapped around the carcass for one complete revolution whereupon the operator cuts off the convolution attached to the tire from the remainder of the supply and joins the ends on the carcass surface. The action of the guiding members 11 is associated by the breaker riding freely on the air cushion provided by the passage of air under pressure through the member 14 having a porous plastic surface. The feed out of the breaker length from its spool is effected by the conveyor 7 and is taken up by the building drum 15, rotation of the drum and movement of the conveyor being such as to provide the same linear speed of breaker feed as that of the outer periphery of the carcass.

Figure 2:
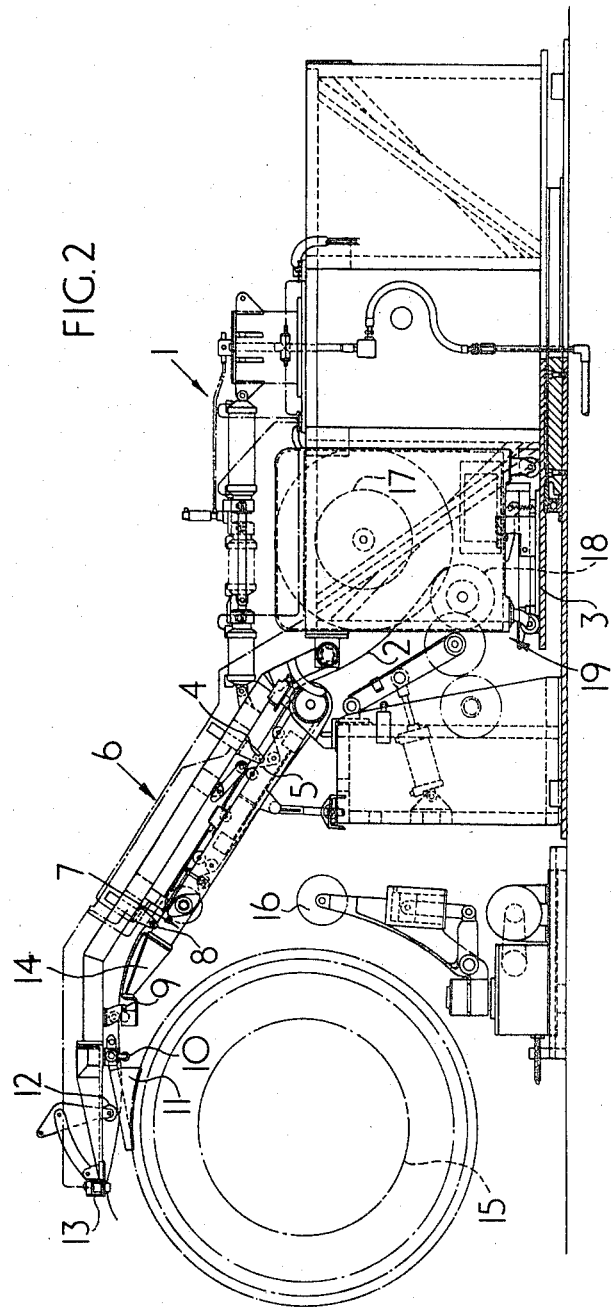
FIG. 2 is a side view of a part of the apparatus shown in FIG. 1 together with a conveyor and a tire building former showing the arm in the supply position with the terminal roller in the retracted position.

The guiding members 11 and roller 12 are then returned from the extended position shown in FIGS. 2 and 4 to the retracted position shown in FIG. 1 and the free end of the breaker strip is then gripped by the clamping device 13 between the jaw 13b and the surface 13a and the arm is actuated to be raised clear of the conveyor into its upwardly extending position with the breaker length still attached to the supply spool supported whereupon the rollers 4 and 8 lift the length from the conveyor 7, the length then being on the rollers 4, 8, 9 and 10. The breaker applied to the carcass is then rolled down by the apparatus described in our copending U.S. patent application No. 711,725 filed Mar. 8, 1968.

The turntable is now indexed to the next position so that the material to make the second breaker layer, disposed along the length of the next upwardly extending arm, is located adjacent to the supply position. The sequence of operation for this breaker arm in conjunction with the conveyor is the same as that described for the first arm, the third and fourth arms each being similarly actuated, in turn, to apply four breaker layers to the carcass mounted on the tire building drum.

It will be appreciated that the apparatus according to the invention ensures that little or no handling of the breaker is required in its passage from the spool to the tire so that the danger of distortion of the material, and the serious results which may ensue, is substantially obviated.

In addition, accurate location of the breaker symmetrically with the carcass is ensured, by virtue of the apparatus in accordance with the invention, and less operator fatigue results from the fact that all of the operations are performed by machine with the exception of the cutting and joining of each breaker layer.

The result of the advantages outlined is that a very accurate and uniform tire is quickly produced.

It will be appreciated that as is well-known, the sequence of operations of the apparatus described can be automatically sequenced to ensure speed and avoidance of error.

Having now described my invention—what I claim is:

1. Apparatus for supplying flexible sheet material to an application area comprising a storage unit for said material, conveying means for feeding said material from the storage unit on a conveying surface, material holding means operable to hold a length of said material extending from the storage unit in a position over the conveying means and operable to drop the said material onto the conveying means to permit a supply of material to be withdrawn from the storage unit and material aligning means comprising spaced apart guiding members on the material holding means, an air cushion device on the conveying means and operatively located adjacent said guiding members to cause said flexible strip material to ride freely between said spaced apart guiding members and align itself with same and a roller on the material holding means to roll down at said application area the said material to maintain said alignment.

2. Apparatus according to claim 1 wherein the guide members comprise a pair of guides, each guide having an inclined leading portion so that together, the guides present a gradually narrowing entry for the said material.

3. Apparatus according to claim 1 wherein the air cushion device comprises an air-pressurisable porous plate.

4. Apparatus according to claim 1 wherein the conveyor surface comprises an endless belt.

5. Apparatus according to claim 1 wherein the material holding means comprises an arm.

6. Apparatus according to claim 5 wherein the arm is pivotally mounted at one end.

7. Apparatus according to claim 5 wherein the arm is provided with a plurality of spaced-apart rollers.

8. Apparatus according to claim 5 wherein four arms are pivotally mounted on a turntable rotatable to bring each arm into a supply position.

9. Apparatus according to claim 1 wherein means are provided for retracting the roller form the flexible sheet material.

10. Apparatus according to claim 4 wherein the material holding means also comprises a clamping device for holding the free end of the flexible strip.

11. Apparatus according to claim 1 adapted for use in the manufacture of a pneumatic tire.

References Cited
UNITED STATES PATENTS

| | | | |
|---|---|---|---|
| 1,665,831 | 4/1928 | Williams | 156—405X |
| 2,039,532 | 5/1936 | Heston | 156—406X |
| 2,045,534 | 6/1936 | Stevens | 156—395X |
| 2,253,896 | 8/1941 | Desautels | 156—403 |
| 2,902,082 | 9/1959 | Watson et al. | 156—408X |
| 2,936,813 | 5/1960 | Haase | 156—394X |

BENJAMIN A. BOCHELT, Primary Examiner

S. C. BENTLEY, Assistant Examiner

U.S. Cl. X.R.

156—408; 242—64